(12) United States Patent
Thomson et al.

(10) Patent No.: US 10,807,812 B2
(45) Date of Patent: *Oct. 20, 2020

(54) GRAIN CART WITH AUTOMATIC UNLOADING OF A PREDETERMINED WEIGHT OF CROP MATERIAL

(71) Applicant: Brandt Agricultural Products Ltd., Regina (CA)

(72) Inventors: Greg Thomson, Emerald Park (CA); Josh Dumalski, Regina (CA)

(73) Assignee: Brandt Industries Canada Ltd., Regina, Saskatchewa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,736

(22) Filed: Mar. 27, 2019

(65) Prior Publication Data

US 2019/0218045 A1 Jul. 18, 2019

Related U.S. Application Data

(63) Continuation of application No. 15/445,160, filed on Feb. 28, 2017, now Pat. No. 10,278,328.

(51) Int. Cl.
| | |
|---|---|
| *B65G 67/24* | (2006.01) |
| *B65G 65/34* | (2006.01) |
| *A01D 90/10* | (2006.01) |
| *A01D 41/12* | (2006.01) |

(52) U.S. Cl.
CPC ......... *B65G 67/24* (2013.01); *A01D 41/1217* (2013.01); *A01D 90/10* (2013.01); *B65G 65/34* (2013.01)

(58) Field of Classification Search
CPC ................ A01D 41/1217; B65G 67/24; B65G 2814/0344; B65G 2814/0319
USPC ......................................... 414/21; 56/10.2 R
See application file for complete search history.

(56) References Cited

U.S. PATENT DOCUMENTS

| | | | |
|---|---|---|---|
| 3,734,215 A | * | 5/1973 | Smith .................... G01G 3/142 177/59 |
| 3,994,512 A | | 11/1976 | Parker et al. |
| 5,013,208 A | | 5/1991 | Grieshop |
| 5,100,281 A | | 3/1992 | Grieshop |
| 5,108,249 A | | 4/1992 | Kinzenbaw et al. |
| 5,139,314 A | | 8/1992 | Deckler |
| 5,340,265 A | | 8/1994 | Grieshop |
| 5,407,137 A | | 4/1995 | Linde et al. |

(Continued)

*Primary Examiner* — Lynn E Schwenning
(74) *Attorney, Agent, or Firm* — Frost Brown Todd LLC; Nicole M. Tepe (57) ABSTRACT

A grain cart is provided having a storage hopper for holding crop material, load cells positioned on the grain cart to measure a weight of crop material in the grain cart and an indicator connected to the load cells. The indicator can be operative to receive signals from the load cells indicating the weight measured by the load cells and to send an electrical signal on an output connection in response to a predetermined weight of crop material being removed from the grain cart. The output connection can be electrically connected to a close gate conductor wire that is operatively connected to the gate actuator, so an electrical signal generated by the indicator on the output connection of the indicator causes the gate actuator to close gates in the storage hopper stopping crop material from being discharged from the storage hopper.

17 Claims, 11 Drawing Sheets

(56) References Cited

U.S. PATENT DOCUMENTS

| | | | |
|---|---|---|---|
| 5,409,344 A | 4/1995 | Tharaldson |
| 5,477,937 A | 12/1995 | Chagnon |
| 5,516,253 A | 5/1996 | Linscheid et al. |
| 5,538,388 A | 7/1996 | Bergkamp et al. |
| 5,615,990 A | 4/1997 | Grieshop |
| 5,655,872 A | 8/1997 | Plotkin |
| 5,659,470 A | 8/1997 | Goska et al. |
| 5,666,793 A | 9/1997 | Bottinger |
| 5,733,094 A | 3/1998 | Bergkamp et al. |
| 5,788,055 A | 8/1998 | Stewart et al. |
| 5,842,920 A | 12/1998 | Siepker |
| 5,876,176 A | 3/1999 | Smith et al. |
| 5,888,044 A | 3/1999 | Baskerville |
| 5,904,365 A | 5/1999 | Dillon |
| 5,980,189 A | 11/1999 | Rubner |
| 6,017,182 A | 1/2000 | Grieshop |
| 6,042,326 A | 3/2000 | Thomas et al. |
| 6,095,616 A | 8/2000 | Grieshop |
| 6,131,691 A | 10/2000 | Morch |
| 6,135,484 A | 10/2000 | Lauronen et al. |
| 6,216,071 B1 | 4/2001 | Motz |
| 6,261,050 B1 | 7/2001 | Kuhns |
| 6,296,435 B1 | 10/2001 | Wood et al. |
| 6,308,976 B1 | 10/2001 | Mitchell |
| 6,434,462 B1 | 8/2002 | Bevly et al. |
| 6,488,114 B1 | 12/2002 | McMahon et al. |
| 6,497,546 B2 | 12/2002 | Wood et al. |
| 6,591,875 B2 | 7/2003 | Zaun et al. |
| 6,632,135 B2 | 10/2003 | Matousek et al. |
| 6,682,416 B2 | 1/2004 | Behnke et al. |
| 6,767,174 B2 | 7/2004 | Cresswell |
| 6,776,569 B1 | 8/2004 | McMahon et al. |
| 6,893,202 B2 | 5/2005 | Hunt |
| 6,943,824 B2 | 9/2005 | Alexia et al. |
| 7,010,425 B2 | 3/2006 | Gray et al. |
| 7,034,666 B2 | 4/2006 | Knutson |
| 7,099,760 B2 | 8/2006 | Lin et al. |
| 7,134,830 B2 | 11/2006 | Wood |
| 7,191,061 B2 | 3/2007 | McKay et al. |
| 7,198,337 B2 | 4/2007 | Deckler et al. |
| 7,225,060 B2 | 5/2007 | O'Connor et al. |
| 7,287,639 B2 | 10/2007 | Brandt |
| 7,381,131 B1 | 6/2008 | Harpole |
| 7,494,409 B2 | 2/2009 | Voss et al. |
| 7,507,917 B2 | 3/2009 | Kaltenheuser |
| 7,540,700 B2 | 6/2009 | Hook |
| 7,543,365 B2 | 6/2009 | Van Mill et al. |
| 7,756,624 B2 | 7/2010 | Diekhans et al. |
| 7,810,823 B2 | 10/2010 | Van Mill et al. |
| 8,047,757 B1 | 11/2011 | Wood |
| 8,167,527 B2 | 5/2012 | Kinzenbaw |
| 8,260,499 B2 | 9/2012 | Boydell |
| 8,328,497 B2 | 12/2012 | Wood |
| 8,544,574 B2 | 10/2013 | Fegley et al. |
| 8,565,984 B2 | 10/2013 | Mayfield et al. |
| 8,585,343 B2 | 11/2013 | Wood |
| 8,684,649 B2 | 4/2014 | Redekop |
| 8,702,368 B2 | 4/2014 | Van Mill et al. |
| 9,039,340 B2 | 5/2015 | Van Mill et al. |
| 9,102,478 B2 | 8/2015 | Van Mill et al. |
| 9,889,785 B1 * | 2/2018 | Van Horn .............. G01G 19/12 |
| 10,278,328 B2 * | 5/2019 | Thomson .............. B65G 67/24 |
| 2004/0184905 A1 | 9/2004 | Kinzenbaw et al. |
| 2007/0083293 A1 | 4/2007 | Applegate et al. |
| 2010/0209223 A1 | 8/2010 | Van Mill et al. |
| 2010/0254792 A1 | 10/2010 | Kinzenbaw |
| 2011/0095503 A1 | 4/2011 | Dodd et al. |
| 2011/0164952 A1 | 7/2011 | Hollenberg |
| 2011/0175322 A1 | 7/2011 | McMahon et al. |
| 2012/0234934 A1 * | 9/2012 | Score ................... E01C 19/203 239/7 |
| 2013/0292407 A1 * | 11/2013 | Beavis ................. B67D 7/221 222/1 |
| 2014/0169932 A1 | 6/2014 | Farley et al. |
| 2014/0365170 A1 * | 12/2014 | Van Mill ................ B60P 1/42 702/173 |

* cited by examiner

GRAIN CART WITH AUTOMATIC UNLOADING OF A PREDETERMINED WEIGHT OF CROP MATERIAL

FIELD OF THE INVENTION

This application claims priority to and benefit of U.S. patent application Ser. No. 15/445,160, entitled "Grain Cart with Automatic Unloading of a Predetermined Weight of Crop Material," filed Feb. 28, 2017, the contents of which are incorporated herein in their entirety for all purposes.

The present invention relates to a grain cart and more particularly to components and methods for automatically unloading a predetermined weight of crop material from the grain cart.

BACKGROUND

Grain carts are typically used to transfer grain or other crop material from a combine harvester to a grain truck or bin. The grain cart typically comprises a storage hopper for crop material, an auger assembly for emptying crop material from the storage hopper and a set of ground wheels so that the grain cart can be towed. A tractor is commonly used to tow the grain cart and the auger assembly of the grain cart can be driven off of the power take off (PTO) of the tractor (although hydraulics, etc. could also be used to power the auger assembly).

In use, the grain cart is towed by the tractor to a combine harvester where the crop material is unloaded from the combine harvester into the grain cart. With the crop material loaded into the storage hopper of the grain cart, the tractor can tow the grain cart to a truck, trailer, storage bin, etc. and use the auger assembly to unload the crop material from the grain cart into the truck, trailer, storage bin, etc.

If an operator wants to unload a specific amount (weight) of crop material from a grain cart. The operator will typically watch a monitor inside the cab of the tow vehicle that shows how much the crop material, currently in the grain cart, weighs and when the desired weight of crop material has been removed, the operator can stop the crop material from being discharged from the grain cart (typically by shutting gates in the bottom of the grain cart storage hopper or by stopping the auger assembly on the grain cart). However, manually doing this requires a near constant attention by the operator because he or she has to watch the weight of the crop material decreasing on the monitor and manually press a switch or button to stop the crop material from continuing to be discharged out of the grain cart. If this operator is not paying enough attention, he or she could unload too much crop material from the grain cart before he or she realizes it. Alternatively, even if the operator is paying close attention, he or she has to use their best judgement of when to stop the crop material from being discharged. Judging when to stop the crop material from being discharged from the grain cart can be difficult since many grain carts, especially the larger grain carts, can discharge crop material quite fast. If the operator presses the necessary switch or button to stop the crop material too early or too late, the desired weight of crop material will not be discharged out of the grain cart. Additionally, even after the gates are shut by the operator, there is still crop material in the auger assembly, so crop material can continue to be discharged from the grain cart even after the gates have been closed and until all the crop material still present in the auger assembly when the gates were closed have been discharged out of the grain cart.

There have been some attempts to automate the unloading of a predetermined weight of crop material from a grain cart, but they have been overly complex and usually involve modifications or changes to the hydraulics on the grain cart in order to operate.

BRIEF SUMMARY

In a first aspect, a grain cart is provided. The grain cart can have a frame, at least two ground wheels attached to the frame, a hitch assembly attached to a front end of the frame, a storage hopper provided on the frame, the storage hopper having a center portion in a bottom of the storage hopper, an auger assembly operatively connected to the storage hopper to discharge particulate material from the storage hopper out of the grain cart, a transport assembly provided beneath the center portion of the storage hopper to direct crop material into the auger assembly, at least one opening in the center portion of the storage hopper leading into the transport assembly, a selectively openable gate associated with each of the at least one opening and operable to cover and uncover the opening, a gate actuator operably connected to each gate and operable to open and close each gate, at least one load cell positioned on the grain cart to measure a weight of crop material in the grain cart, a gate close switch, an indicator operably connected to the at least one load cell, the indicator operative to receive signals from the at least one load cell indicating the weight measured by the at least one load cell and to send an electrical signal on an output connection in response to a predetermined weight of crop material being removed from the grain cart, and at least one close gate conductor wire operatively connected between the gate close switch and the gate actuator such that a voltage applied to the at least one close gate conductor wire will cause the gate actuator to close each gate, the output connection electrically connected to the at least one close gate conductor wire. When the indicator sends the electrical signal on the output connection, the electrical signal passes to the at least one close gate conductor wire and the gate actuator closes each gate.

In a second aspect, an automatic unload wiring harness for modifying a grain cart to automatically unload an amount of crop material is provided. The automatic unload harness has a first connector connectable to a control interface wiring harness connector, a second connector connectable to a hydraulic wiring harness connector, an indicator connector connectable to an output connection of an indicator and a plurality of automatic unload conductor wires connected between the first connector and the second connector. A third gate close conductor wire is one of the plurality of automatic unload conductor wires, the third gate close conductor electrically connecting a first gate close conductor wire and a third gate close conductor wire when the first connector of the automatic unload wiring harness is connected to the control interface wiring harness connector and the second connector of the automatic unload wiring harness is connected to the hydraulic wiring harness connector. The indicator connector is electrically connected to the third gate close conductor. The first gate close conductor wire is electrically connected to a close gate switch and the second gate close conductor wire is electrically connected to a gate solenoid valve connected to a gate actuator. The gate solenoid valve operative to cause the gate actuator to close a gate, stopping crop material from discharging from a storage hopper of the grain cart in response to a voltage being supplied on the second gate close conductor to the gate solenoid valve.

In a third aspect, a method of modifying a grain cart to automatically unload a predetermined weight of crop material is provided. The method including providing a grain cart having a storage hopper for storing crop material, at least one load cell positioned on the grain cart to measure a weight of crop material in the grain cart, and at least one close gate conductor wire operatively connected between a gate close switch and a gate actuator such that a voltage applied to the at least one close gate conductor wire causes the gate actuator to close a gate in the storage hopper stopping crop material from discharging out of the storage hopper, providing an indicator operably connected to the at least one load cell, the indicator operative to receive signals from the at least one load cell indicating the weight measured by the at least one load cell and to send an electrical signal on an output connection in response to a predetermined weight of crop material being removed from the grain cart; and electrically connecting the output connection of the indicator to the at least one close gate conductor wire.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

FIGS. 1-5 illustrates a grain cart 10 that can automatically unload a predetermined weight of crop material. The grain cart 10 can have a frame 20, ground wheels 30, a hitch assembly 40, a storage hopper 60 for storing crop material and an auger assembly 80. Crop material can be loaded into the storage hopper 60 for transport to another location. When the grain cart 10 has been towed by a tow vehicle to another location, the auger assembly 80 can be used to unload the crop material from the storage hopper 60 on the grain cart 10.

The frame 20 can support the storage hopper 60 and the ground wheels 30 can be operatively attached to the frame 20. Typically, there are two ground wheels 30 per side. In one aspect, the ground wheels 30 may be part of a track assembly where a track encircles the ground wheels 30 on repeach side of the grain cart 10 to provide tracks instead of tires for the grain cart 10. The hitch assembly 40 can be connected to the front of the frame 20 and the hitch assembly 40 can then be hitched to a tow vehicle, such as a tractor (not shown), to tow the grain cart 10.

A power take off (PTO) assembly 45 can be provided on the grain cart 10 that is connectable to a power take off on a tow vehicle (not shown). The PTO assembly 45 takes rotational motion transferred to it by the tow vehicle and can use this rotational motion to drive the auger assembly 80 and other assemblies on the grain cart 10.

The storage hopper 60 can have an interior portion for storing crop material. The upper side walls 62 of the storage hopper 60 can be relatively vertical while the lower walls 64 can be angled inwards to direct crop material into a center portion 66 at the bottom of the hopper 60. Crop material loaded into the storage hopper 60 will be directed by gravity by these angled lower walls 64 towards the center portion 66 in the bottom of the storage hopper 60.

One or more load cells 48 can be provided on the grain cart 10 to take measurements of the weight of the storage hopper 60 and/or the grain cart 10 and therefore also the weight of any crop material contained in the storage hopper 60. The load cells 48 can be provided in a number of positions to weigh the storage hopper 60 and/or the grain cart 10. However, in one aspect, load cells 48 can be provided on the hitch assembly 40 to measure a tongue weight of the grain cart, and a load cell 48 in a hub of each wheel 30 or on a mounting frame if tracks are installed. By measuring the weight of the grain cart 10 when it is empty, using the load cells 48, a weight of crop material in the grain cart 10 can easily be obtained by subtracting the weight of the grain cart 10 when it is empty from the weight of the grain cart 10 measured by the load cells 48 when the grain cart 10 contains crop material.

Figure 6:
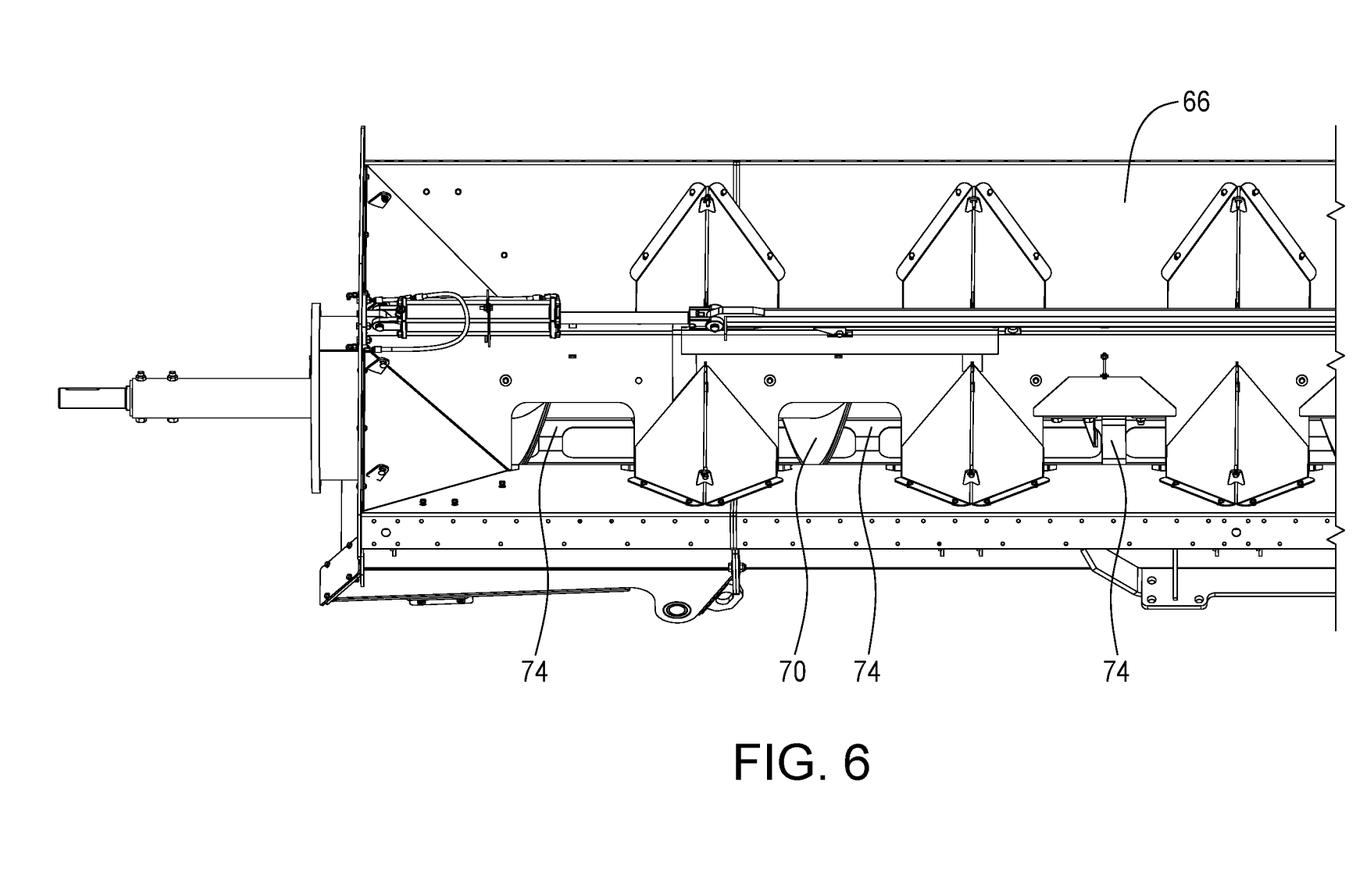
FIG. 6 is a view of the bottom of a storage hopper of a grain cart with openings to a transport assembly.
Figure 7:
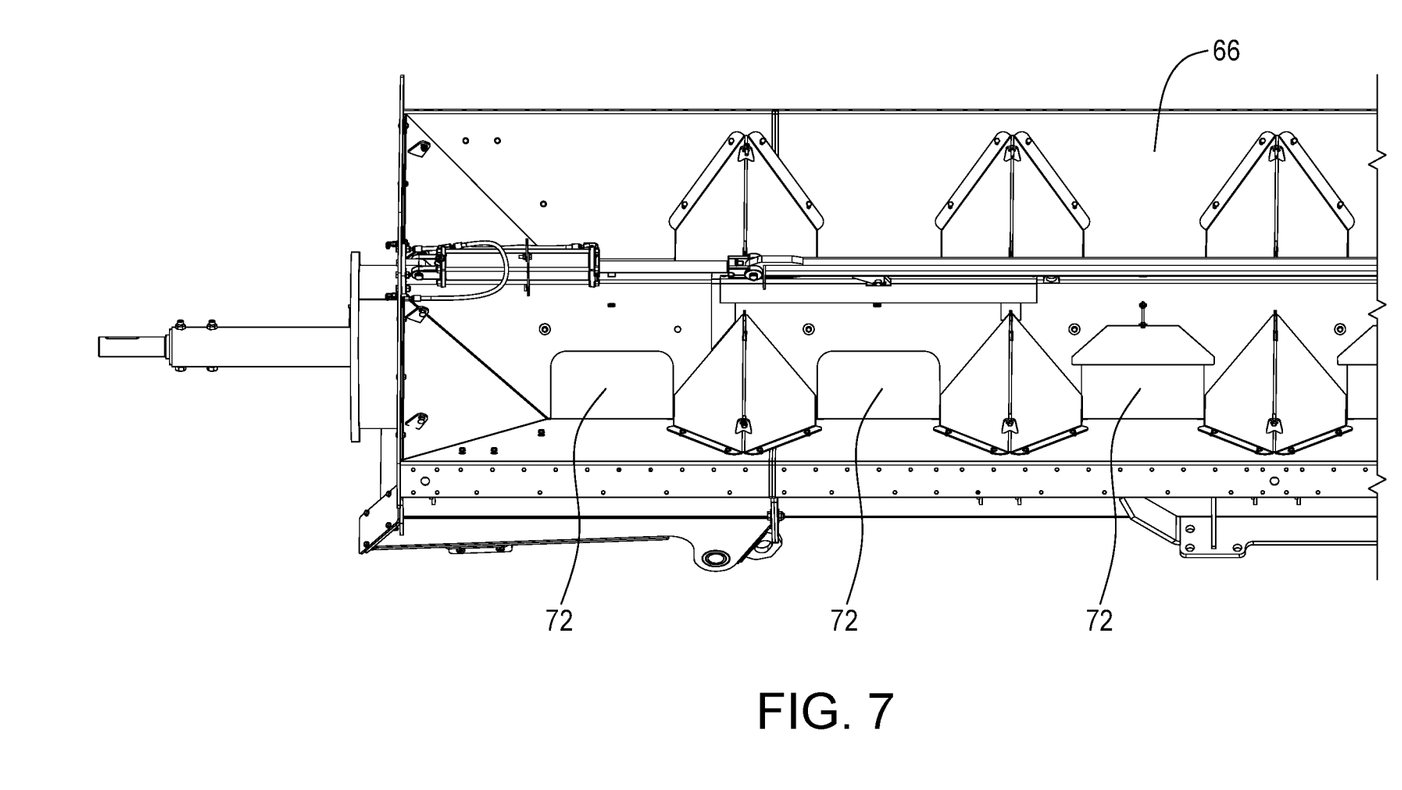
FIG. 7 is a view of the bottom of the storage hopper of FIG. 6 with the openings closed by gates.

FIGS. 6 and 7 show the center portion 66 in the bottom of the storage hopper 60. Typically, a screen can be provided over the center portion 66, but it is not shown in these figures to better illustrate the components in the center portion 66. The center portion 66 of the storage hopper 60 can have a series of selectively openable gates 72 and corresponding openings 74 beneath the gates 72. Beneath these openings 74 a transport assembly 70 for moving crop material that has fallen through the openings 74 and into the transport assembly 70 can be provided so that the openings 74 lead into the transport assembly 70. The transport assembly 70 can move crop material, that has fallen through the openings 64, towards the front of the grain cart 10 and into the auger assembly 80. In the auger assembly 80, the crop material can be moved up the auger assembly 80 to be discharged out of the grain cart 10.

The transport assembly 70 is typically a pair of augers and corresponding auger housings, but it can also be a conveyor belt, etc. and the transport assembly 70 can be driven by the PTO assembly 45. In another aspect, if an intake end of the auger assembly 80 extends under the center portion 66 of the storage hopper 60, such as in a grain cart with corner-auger configurations, the transport assembly 60 may be a hopper or chute to direct the crop material falling through the openings 74 into the auger assembly 80.

Figure 1:
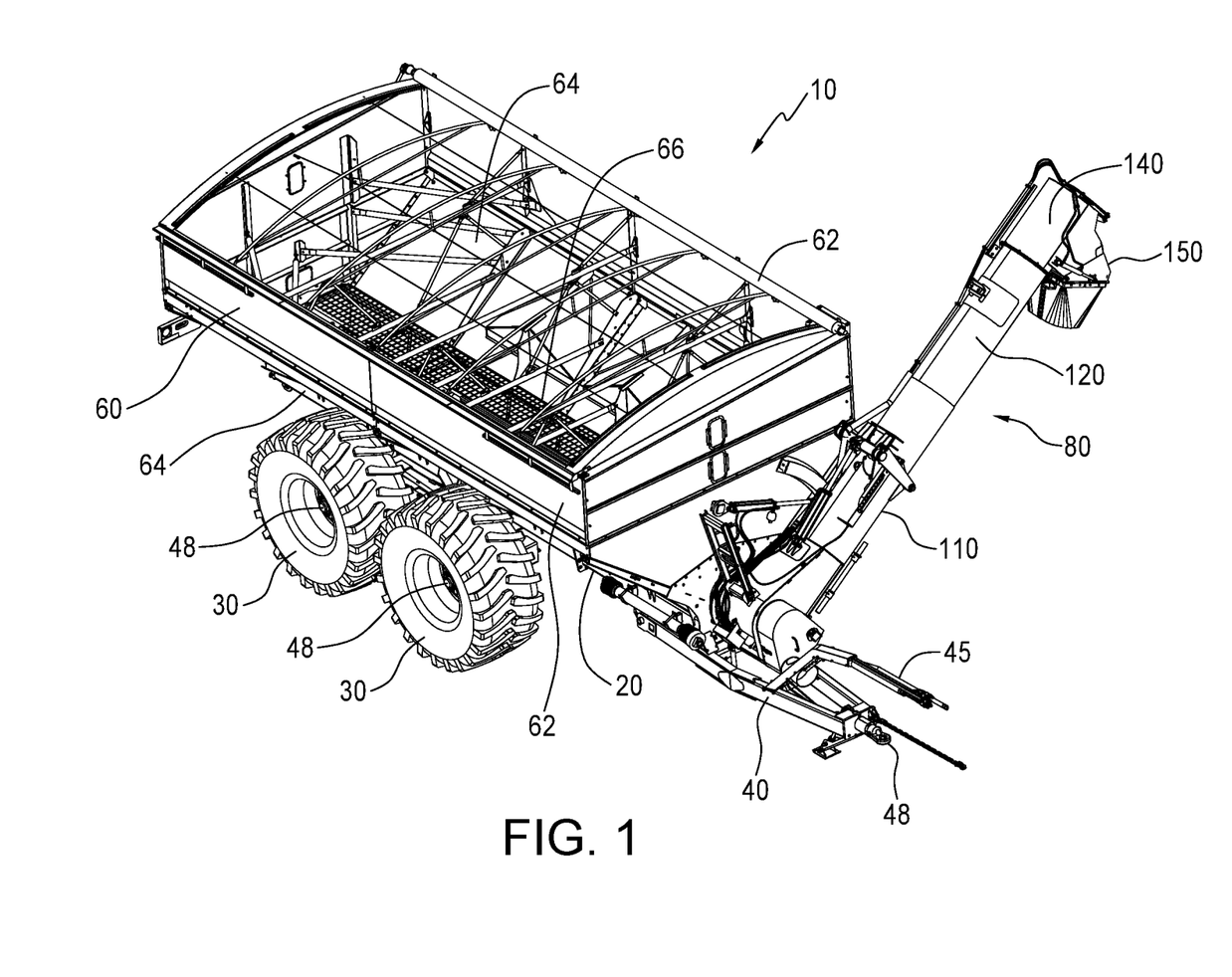
FIG. 1 is a perspective view of a grain cart.
Figure 2:
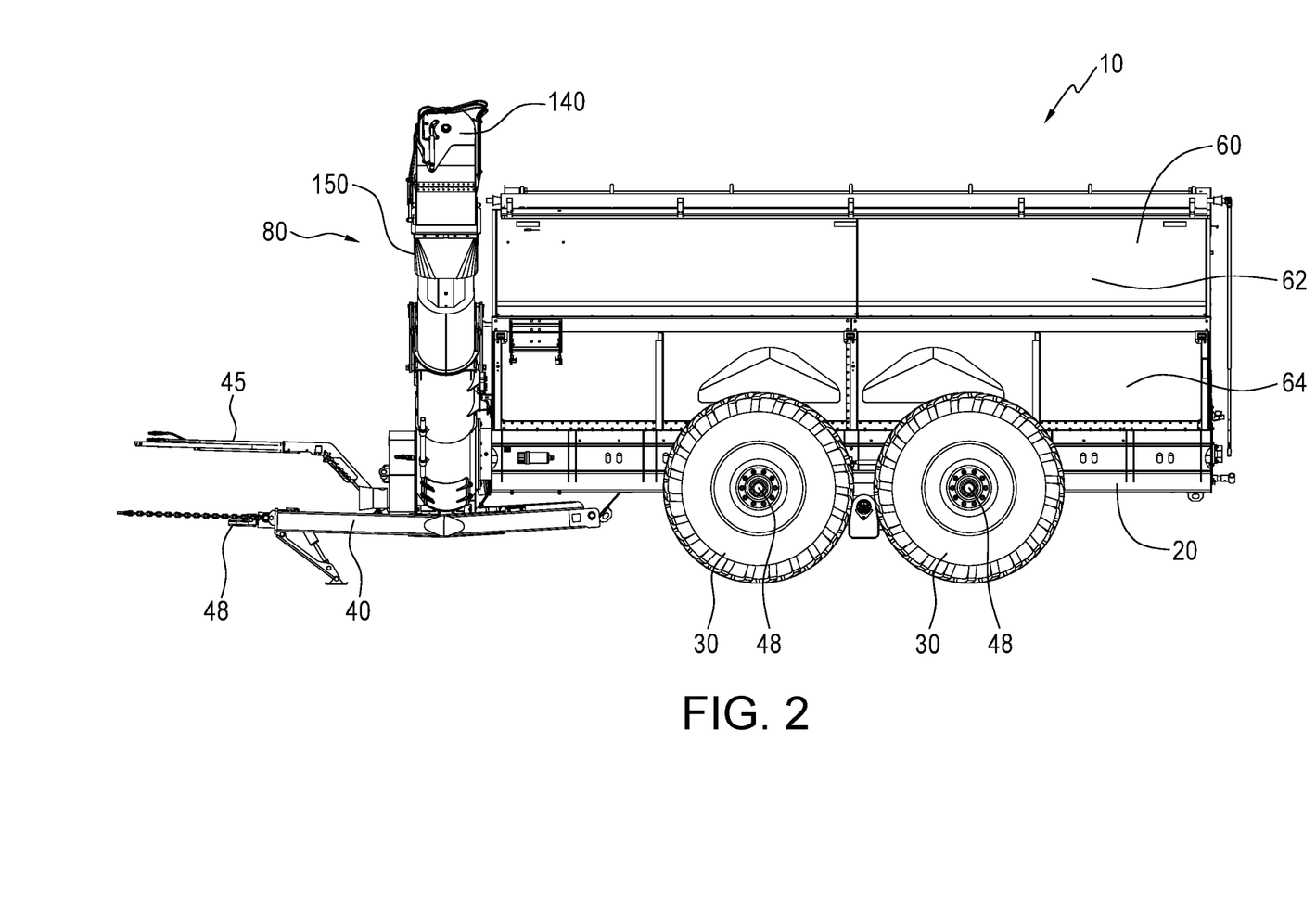
FIG. 2 is a side view of the grain cart of FIG. 1.
Figure 3:
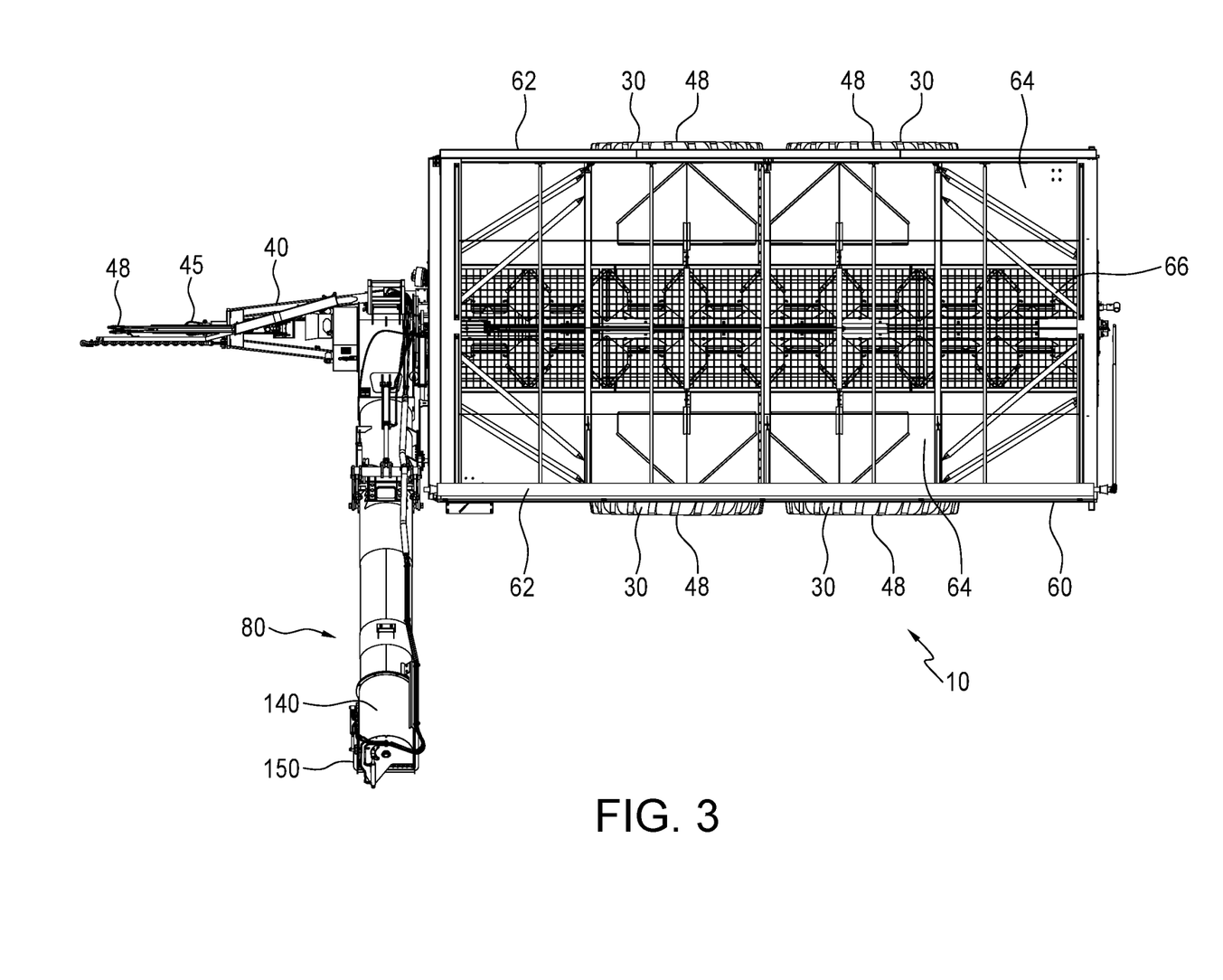
FIG. 3 is a top view of the grain cart of FIG. 1.
Figure 4:
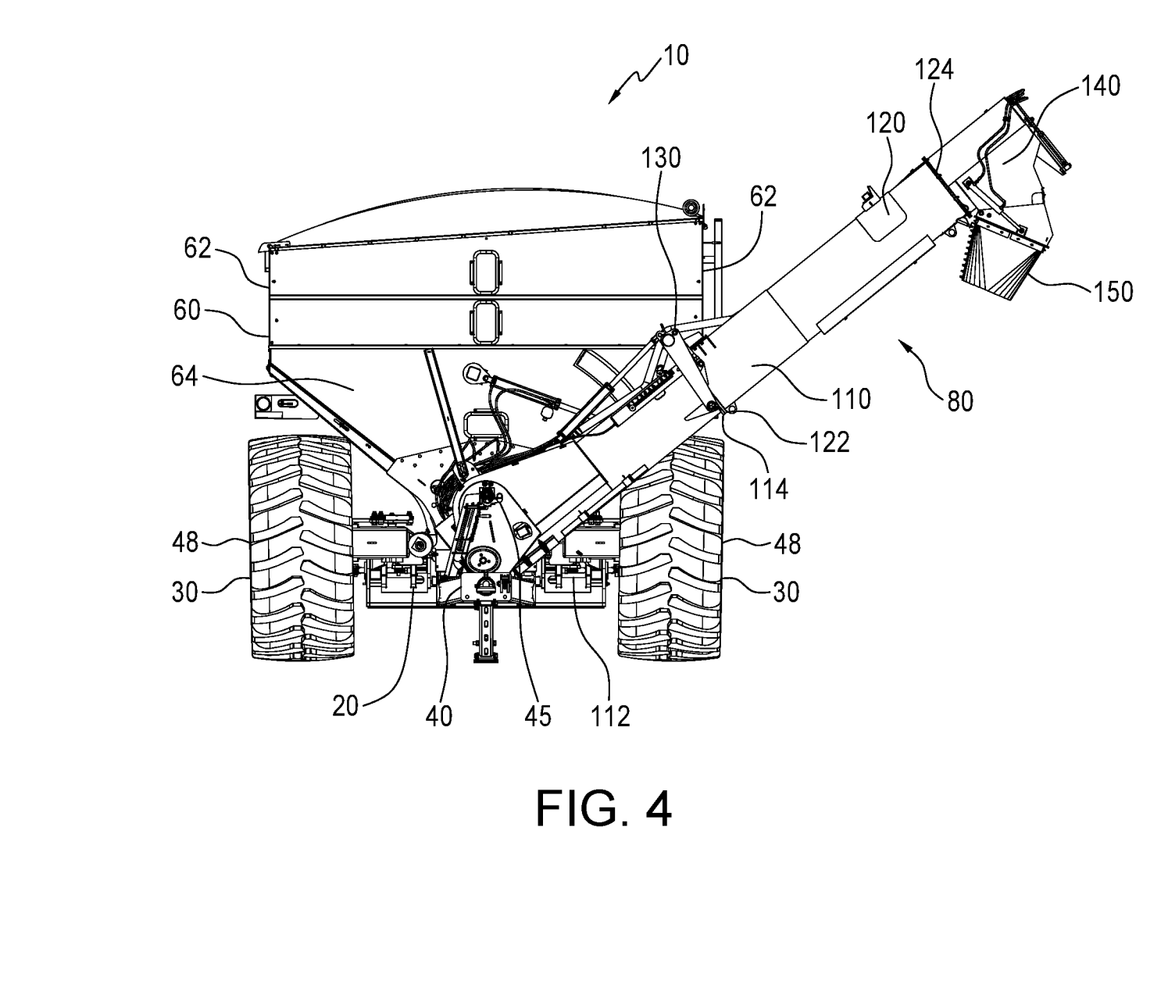
FIG. 4 is a front view of the grain cart of FIG. 1 with the auger assembly in an operating position.
Figure 5:
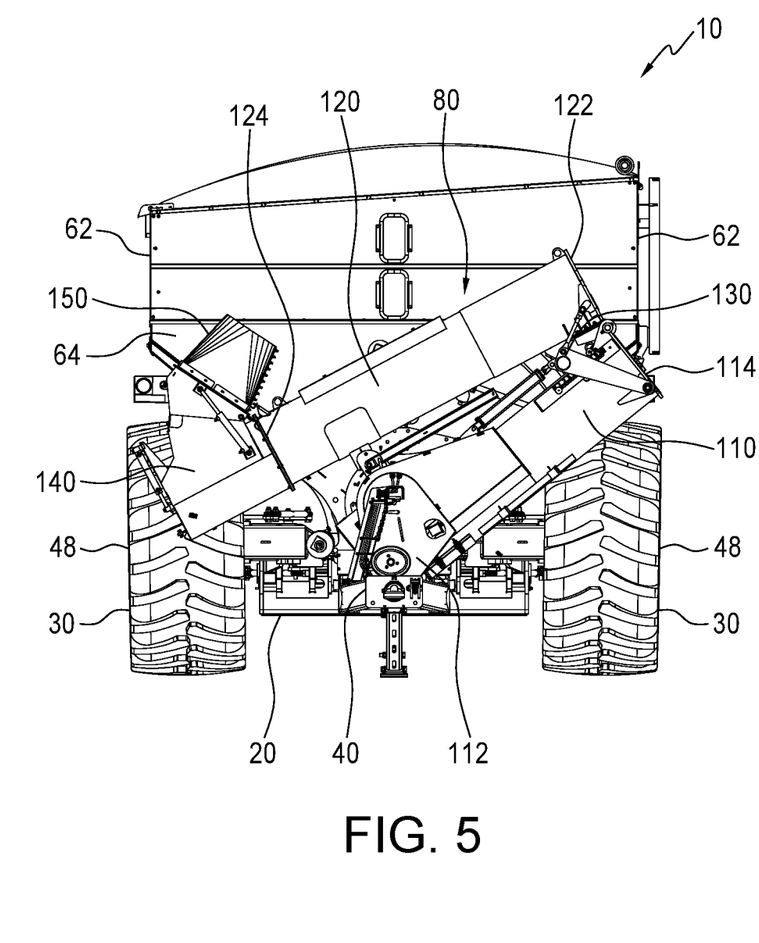
FIG. 5 is a front view of the grain cart of FIG. 1 with the auger assembly in a transport position.

FIG. 4 illustrates a front view of the grain cart 10 where the auger assembly 80 is in an operating position ready to discharge crop material out of the grain cart 10 and into an adjacent truck, trailer, storage bin, etc. and FIG. 5 shows the auger assembly 80 folded up into a transport position. The auger assembly 80 can have a lower auger section 110 and an upper auger section 120. When the auger assembly 80 is in the operating position, the upper auger section 120 and the lower auger section 110 can be positioned coaxial to one another.

The lower auger section 110 and the upper auger section 120 can each have a driveshaft and auger flighting inside. The auger fighting in the lower auger section 110 will convey crop material up the lower auger section 110 and the auger fighting in the upper auger section 120. The lower auger section 110 can have an intake end 112 that is joined with an outlet of the transport assembly 70 so that crop material that has reached the end of the transport assembly 70 is conveyed into the intake end 112 of the lower auger section 110. This crop material will then be conveyed up the lower auger section 110 by the flighting in the lower auger section 110 until it reaches a top end 114 of the lower auger section 110. From the top end 114 of the lower auger section 110, the crop material can be transferred to the bottom end 122 of the upper auger section 120 and the flighting in the upper auger section 120 can convey the crop material up the upper auger section 120 to a discharge end 124 of the upper auger section 120.

The discharge end 124 of the upper auger section 120 can be pivotally connected to a discharge assembly 140. A spout 150 can be provided on the discharge assembly 140 to direct the flow of crop material exiting from the discharge end 140 of the upper auger section 120.

When the grain cart 10 is to be transported, especially over relatively long distances, the upper auger section 120 can be pivoted around a pivot hinge 130 so that the upper auger section 120 is no longer coaxial with the lower auger section 110, but rather, rotated around the hinge 130 to be placed closer to parallel with the lower auger section 110 and adjacent to the lower auger section 110 so that the upper auger section 120 does not extend significantly beyond the side of the storage hopper 60 when the grain cart 10 is in the transport position like it does when it is in the operating position.

The hydraulics on the grain cart 10 that control a number of the functions of the grain cart 10 can be controlled by a control interface 300 provided in a cab of a tow vehicle (not shown) where the operator of the tow vehicle has access to the control interface 300. Typically, the control interface 300 for the grain cart 10 can be a joystick such as the one shown in FIG. 8, however, the control interface 300 could also take other forms. On the controls interface 300, there is typically a plurality of switches (buttons) that allow the operator of the tow vehicle to control the various functions of the grain cart 10. Among these various switches on the control interface 300 is an auger out switch 302 that causes the auger assembly 80 on the grain cart 10 to fold out to the operating position and an auger in switch 304 that causes the auger assembly 80 to fold in to the transport position. An operator can open the gates 74 in the center portion 66 of the storage hopper 60 by engaging a gate open switch by pulling the entire control interface 300 backwards towards the operator, to activate the switch. The operator can also stop the movement of the gates 74 by releasing the control interface 300 or close the gates 74 by engaging a gate close switch by pushing the entire control interface 300 forwards away from the operator.

Figure 8:
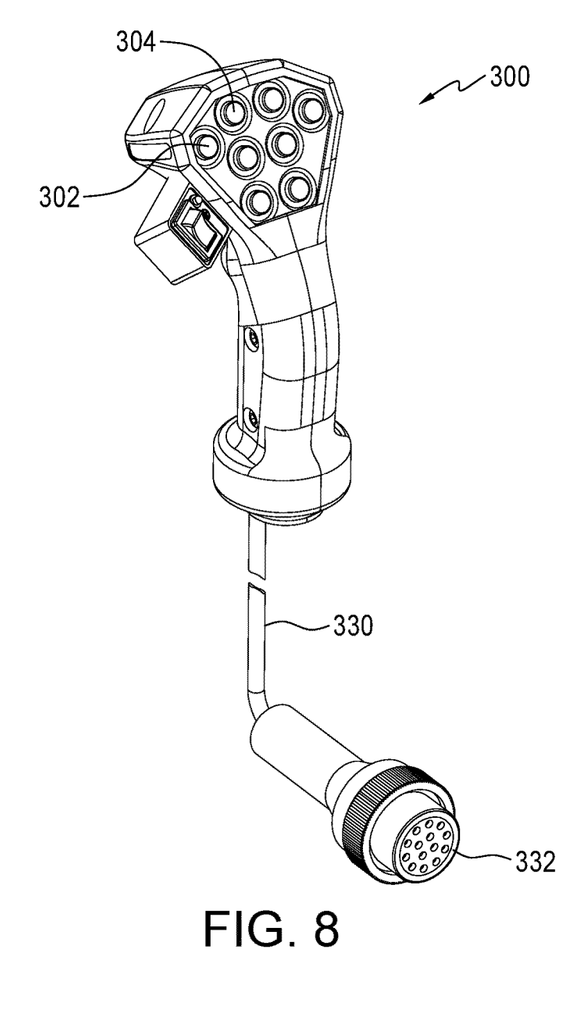
FIG. 8 is a perspective view of a control interface to control the operation of a grain cart.

Additionally, there can be a number of other switches that control other functions of the grain cart 10, such as the in and out movement of the spout 150, the moving up and down of the auger assembly 80, etc.

The control interface 300 and more particularly the switches making up the control interface 300 are connected to a control interface wiring harness 330 comprising a plurality of insulated wires bundled together. The control interface wiring harness 300 can connect to a hydraulic wiring harness on the grain cart 10. Each individual wire in the control interface wiring harness 330 can be connected to one of the switches in the control interface 300 so that an electrical signal can be transmitted through the wire in response to the operator pressing the switch on the control interface 300 the wire is connected to. Additionally, a wire in the control interface wiring harness 330 can carry an electrical signal from the gate open switch and another wire can carry an electrical signal from the gate close switch.

Unlike the hydraulics on the grain cart 10, the auger assembly 80 and the transport assembly 70 can be controlled by the operator of the tow vehicle by controlling the operation of the tow vehicle's power take off connected to the PTO assembly 45 on the grain cart 10.

Figure 9:
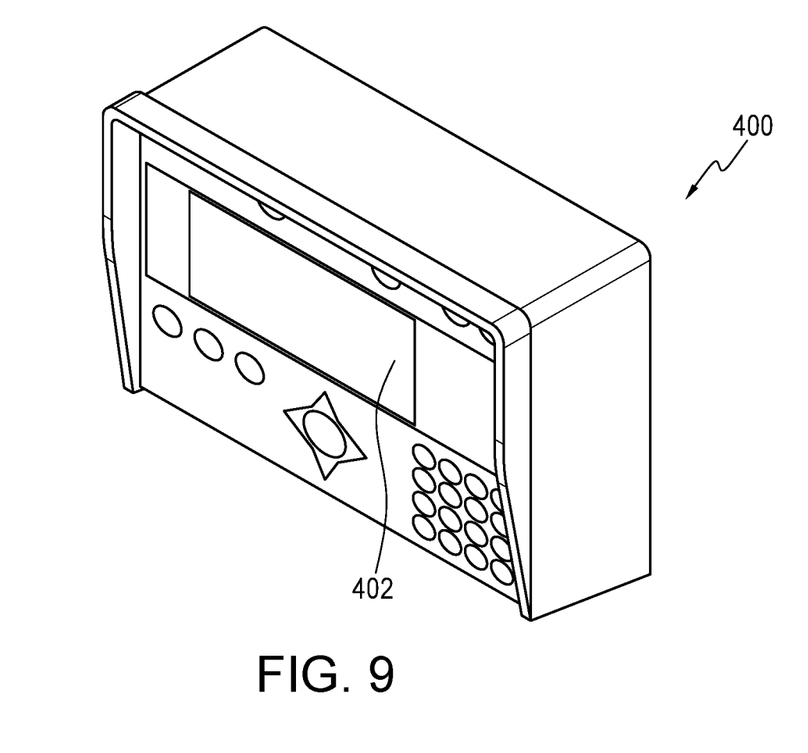
FIG. 9 is a perspective view of an indicator displaying and storing weight information from a load cell on the grain cart.

The load cells 48 can be operatively connected to an indicator 400 in the cab of the two vehicles. The indicator 400 can be a processing device with at least one processor and at least one computer readable memory capable of storing data and program instructions the at least one processor can implement so that the indicator 400 is able to store data, follow program instructions stored in the computer readable memory and perform calculations on the data. Signals can be transmitted from the load cells 48 indicating the weights measured by each of the load cells 48 on the grain cart 10 to the indicator 400 in the cab of the tow vehicle so that the indicator 400 can use these different weights to determine the weight of the grain cart 10. The indicator 400 can have a display 402 on which information can be displayed to the operator of the tow vehicle such as the current weight being measured by the load cells 48, the weight of the grain cart 10 and crop material, the weight of the crop material in the grain cart 10, etc.

In one aspect, the indicator 400 can also store the information received from the load cells 48 during specific periods when the grain cart 10 is discharging crop material out of it using the auger assembly 80 and store this weight information. A proximity sensor can determine when the PTO assembly 45 starts operating and therefore the transport assembly 70 and the auger assembly 80 start operating and a signal from the proximity sensor when this occurs can be used by the indicator 400 to start storing the measurements of the load cells 48 (logging). While the auger assembly 80 is running, the indicator 400 can continue to obtain and store weight measurements from the load cells 48. The indicator 400 can stop storing the weight measurements when the proximity sensor determines that the PTO assembly 45 has stopped operating; meaning the transport assembly 70 and the auger assembly 80 are no longer operating and moving crop material through them. In this manner, the indicator 400 will automatically log the weight measurements taken by the load cells 48 while crop material is discharged out of the grain cart 10 and this logging will be automatically stopped when the PTO assembly 45 is once again stopped and no crop material is being discharged out of the grain cart 10.

Figure 10:
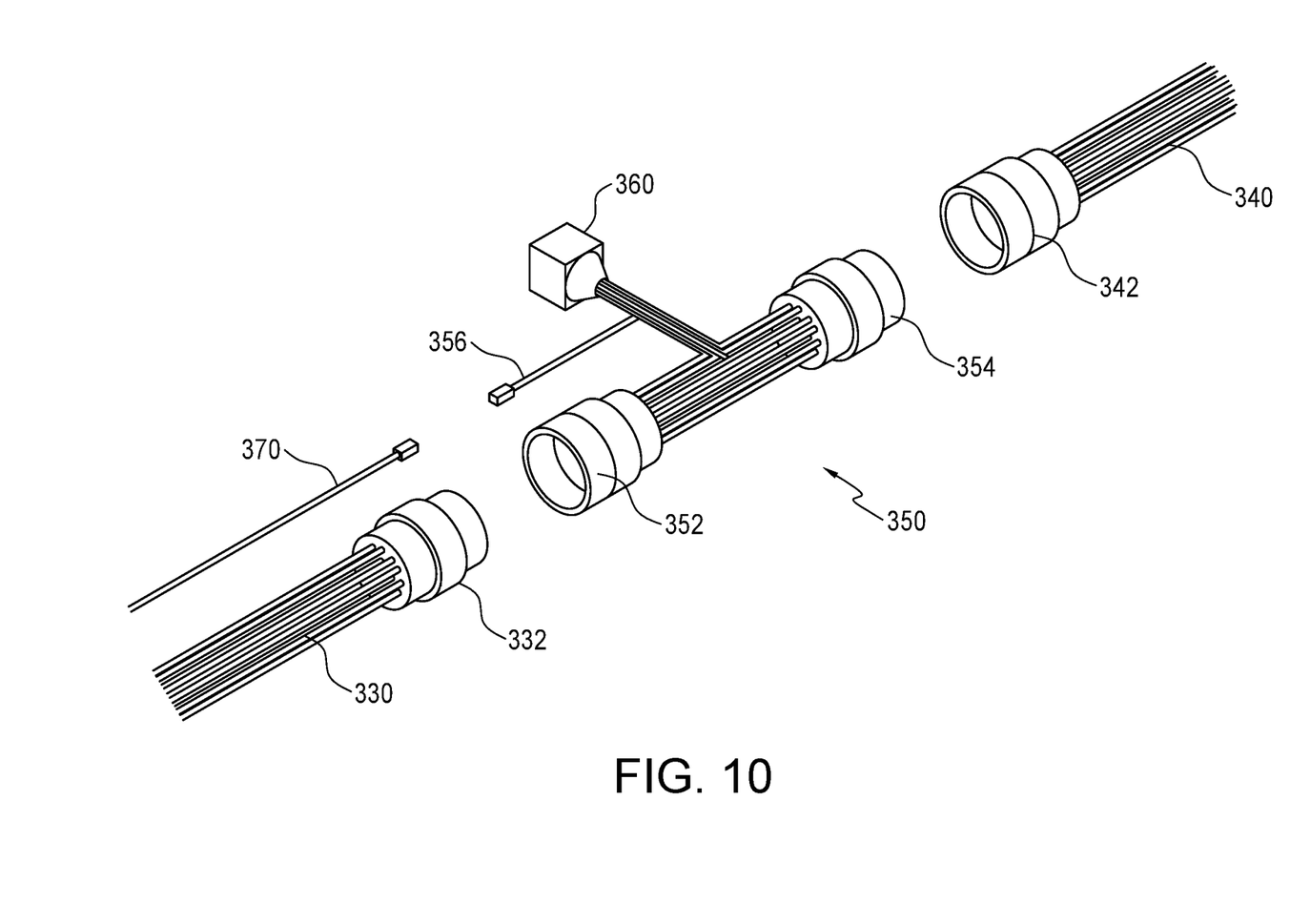
FIG. 10 is a schematic illustration of an automatic unload relay harness that can be added to a grain cart to allow the grain cart to automatically unload a predetermined weight of crop material from the grain cart.

In one aspect, an automatic unload wiring harness 350 can be used to make a grain cart 10 capable of automatically unloading a desired weight of crop material from the storage hopper 60 without the manual intervention of the operator. Referring to FIG. 10, the automatic unload wiring harness 350 can be connected between the control interface wiring harness 330 connected to the control interface 300 and the hydraulic wiring harness 340 connected to the hydraulics on the grain cart 10. A first connector 352 can be provided for connecting to a control interface wiring harness connector 332 on the control interface wiring harness 330 and a second connector 354 can be provided for connecting to a hydraulic wiring harness connector 342 on the hydraulic wiring harness 340. An indicator connector 356 can be provided for connection to an output connection 370 connected to the indicator 400. Optionally, a relay 360 can be provided in the automatic unload wiring harness 350 connected to the indicator connector 356 if the voltage supplied by the indicator 400 along the output connection 370 is a relatively low voltage.

Typically, the control interface wiring harness connector 332 will be connected to the hydraulic wiring harness connector 342 to connect the control interface wiring harness to the hydraulic wiring harness 340 of the grain cart 10. Typically, the hydraulic wiring harness connector 342 is positioned in proximity to the hitch assembly 40 so that a person can connect the hydraulic wiring harness connector 342 to the control interface wiring harness connector 332 when the grain cart 10 is hitched to the tow vehicle.

To install the automatic unload wiring harness 350, the control interface wiring harness connector 332 and the hydraulic wiring harness connector 342 can simply be disconnected from one another and the automatic unload wiring harness 350 connected in between. The output connection 370 from the indicator 400 can be run alongside the control interface wiring harness 330 (and attached along the control interface wiring harness 330 if desired) and the output connection 370 can be connected to the indicator connector 356 on the automatic unload wiring harness 350. The automatic unload wiring harness 350 will then be installed inline with the control interface wiring harness 330 and the hydraulic wiring harness 340.

Figure 11:
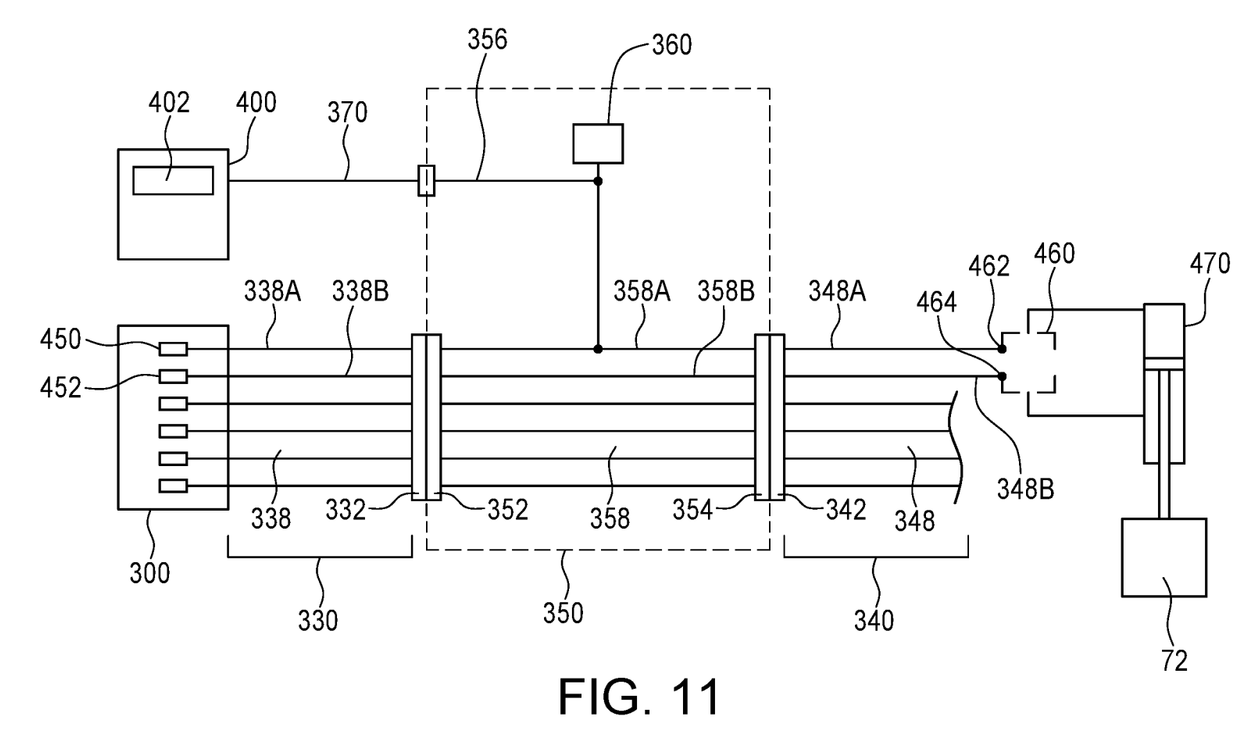
FIG. 11 is a schematic diagram of electrical connections between the control interface and solenoids for the hydraulics on the grain cart used by the grain cart to automatically unload a predetermined weight of crop material from the grain cart.

Referring to FIG. 11 a schematic illustration of the automatic unload wiring harness 350 is shown. The automatic unload wiring harness 350 can be connected to the control interface wiring harness 330 by connecting the first connector 352 of the automatic unload wiring harness 350 to the control interface wiring harness connector 332 on the control interface wiring harness 330. The automatic unload wiring harness 350 can also be connected to the hydraulic wiring harness 340 by connecting the second connector 354 of the automatic wiring harness 350 to the hydraulic wiring harness connector 342 on the hydraulic wiring harness 340. The indicator connector 356 of the automatic unload wiring harness 350 can be connected to the output connection 370 connected to the indicator 400. With these connections made, the automatic unload harness 350 will be installed in line with the control interface wiring harness 330 and the hydraulic wiring harness 340.

The control interface wiring harness 330 can contain a plurality of control interface conductor wires 338 and the hydraulic wiring harness 340 can also contain a plurality of hydraulic conductor wires 348. Each of the control interface conductor wires 338 can be operably connected to a switch in the control interface 300. Typically, each of the hydraulic conductor wires 348 in the hydraulic wiring harness 340 will correspond with one of the control interface conductor wires 338 in the control interface wiring harness 330 so that when the control interface wiring harness connector 332 is connected to the hydraulic wiring harness connector 342, each of the control interface conductor wires 338 is operably connected by the control interface wiring harness connector 332 and the hydraulic wiring harness connector 342 to the corresponding hydraulic conductor wire 348.

A close gate conductor wire 338A can be provided as one of control interface conductor wires 338 in the control interface wiring harness 330. The close gate conductor wire 338A can be operatively connected to a close gate switch 450 in the control interface 300 so that engaging the close gate switch 450 using the control interface 300 will supply a voltage on the close gate conductor wire 338A.

A corresponding close gate conductor wire 348A can be provided in the hydraulic wiring harness 340 and when the control interface wiring harness connector 332 and the hydraulic wiring harness connector 342 are connected, the close gate conductor wire 338A in the control interface wiring harness 330 will be operatively connected to the close gate conductor wire 348A in the hydraulic wiring harness 340.

The automatic unload wiring harness 350 can have a plurality of automatic unload conductor wires 358 that correspond to the control interface conductor wires 338 in the control interface wiring harness 330 and the hydraulic conductor wires 340 in the hydraulic wiring harness 340. When the automatic unloading harness 350 is connected between the control interface wiring harness 330 and the hydraulic wiring harness 340, the automatic unload conductor wires 358 in the automatic unload wiring harness 350 will operatively connect each of the hydraulic conductor wires 348 with the corresponding control interface conductor wires 338.

The close gate conductor wire 358A can be provided as one of the automatic unload conductor wires 358 in the automatic unload wiring harness 350 and the open gate conductor wire 358B can be provided as another of the automatic unload conductor wires 358. When the automatic unload wiring harness 350 is connected between the control interface wiring harness 330 and the hydraulic wiring harness 340, the close gate conductor wire 358A in the automatic unload wiring harness 350 will operatively and electrically connect the close gate conductor wire 338A in the control interface wiring harness 330 with the close gate conductor wire 338A in the hydraulic wiring harness 340 and the open gate conductor wire 358B in the automatic unload wiring harness 350 will operatively and electrically connect the open gate conductor wire 338B in the control interface wiring harness 330 with the open gate conductor wire 338B in the hydraulic wiring harness 340.

The close gate conductor wire 348A in the hydraulic wiring harness 340 can be attached to a first input 462 on a double acting gate solenoid valve 460. A second input 464 on the gate solenoid valve 460 can be connected to an open gate conductor wire 348B in the hydraulic wiring harness 340, which can in turn be operatively connected to an open gate conductor wire 358B in the automatic unload wiring harness 350, an open gate conductor wire 338B in the control interface wiring harness 330 and thereby to an open gate switch 452 in the control interface 300.

A voltage supplied to the first input 462 of the gate solenoid valve 460 can cause the gate solenoid valve 460 to direct hydraulic fluid to a gate actuator 470, such as a double acting hydraulic cylinder, that is operably connected to the gates 72 in the center portion 66 of the storage hopper 60 in such a manner that the gate actuator 470 closes the gates 72. Conversely, a voltage supplied to the second input 464 of the gate solenoid valve 460 by the gate open conductor wire 348B and ultimately by an operator engaging the gate open switch 452 on the control interface 300, can cause the gate solenoid valve 460 to direct hydraulic fluid to a gate actuator 470 in such a manner that the gate actuator 470 closes the gates 72.

The indicator connector 356 of the automatic unload wiring harness 350 can be connected to the output connection 370 connected to the indicator 400. The indicator connector 356 can be operably connected to the close gate conducting wire 358A of the automatic unload wiring harness 350. In this manner, a voltage supplied by the indicator 400 on the output connection 370 will pass along the indicator connector 356 to the close gate conductor wire 358A in the automatic unload wiring harness 350 and along the close gate conductor wire 358A to the close gate conductor wire 348A in the hydraulic wiring harness 340 and to the first input 462 of the gate solenoid valve 460.

Optionally, a relay 360 can be provided in the automatic unload wiring harness 350 connected between the indicator connector 356 and the gate close conductor wire 358A. In this manner, if the indicator 400 provides a relative low voltage on the output connection 370 (a voltage too low to activate the gate solenoid valve 460), when this low voltage reaches the relay 360, the relay 360 can supply a higher voltage to the close gate conductor wire 358A in the automatic unload wiring harness 350 and thereby to the close gate conductor wire 348A in the hydraulic wiring harness 340. This higher voltage supplied by the relay 360 can be enough to trigger the gate solenoid valve 460. In one aspect, this voltage supplied by the relay 360 can be 12 volts.

The automatic unload wiring harness 350 can receive a voltage signal from the indicator 400 and increase the voltage of this signal, if necessary, using the relay 360 before providing this voltage to the close gate conductor wire 358A in the automatic unload wiring harness 350. This voltage can then be supplied to the close gate conductor wire 348A on the hydraulic wiring harness 340 and therefore to the first input 462 on the gate solenoid valve 460. The gate solenoid valve 460 will react in the same manner as if an operator engaged the close gate switch 450 using the control interface 300 by routing hydraulic fluid to the hydraulic actuator 470 in such a manner that the hydraulic actuator 470 will close the gates 72 in the bottom of the storage hopper 60.

To use the automatic unloading of a desired weight of crop material from the grain cart 10, an operator can set a desired weight of crop material to be unloaded from the grain cart 10 and when this predetermined weight is reached, the gates 72 in the center portion 66 of the storage hopper 60 can be automatically closed and the unloading of the crop material stopped so that only the desired predetermined weight of crop material has been unloaded from the grain cart 10 without intervention of the operator of the tow vehicle.

An operator can enter the desired weight of crop material he or she would like unloaded from the grain cart 10 into the indicator 400. Then when the operator is ready, he or she can use the power take off of the tow vehicle to start the transport assembly 70 and the auger assembly 80 operating. The proximity sensor can determine that the PTO assembly 45 has started rotating and send a signal to the indicator 400 to start it logging (i.e. storing) weight measurements obtained from the load cell 48.

When the operator is ready, he or she can trigger the gate open switch 452 by pulling the control interface 300 towards the operator. This will send a voltage along the open gate conducting wire 338B in the control interface wiring harness 330, through the open gate conducting wire 358B in the automatic unload wiring harness 350 and through the open gate conducting wire 348B in the hydraulic wiring harness 340 until it reaches the second input 464 on the gate solenoid valve 460. Upon receiving this voltage on the second input 464, the gate solenoid valve 460 can send hydraulic fluid to the gate actuator 470 which will open the gates 72 in the center portion 66 of the storage hopper 60, uncovering the openings 74 in the center portion 66 of the storage hopper 60. With the openings 74 uncovered, crop material in the storage hopper 60 can drop through the openings 74 and into the transport assembly 70 beneath the center portion 66 of the storage hopper 60. Once in the transport assembly 70, the transport assembly 70 will move the crop material into the intake of the auger assembly 80. The auger assembly 80 will move the crop material up the auger assembly 80 until it is discharged out the discharge assembly 140 and the spout 150 of the auger assembly 80.

While the crop material is being unloaded out of the storage hopper 60, the weight of the storage hopper 60 is repeatedly being measured by the load cells 48 and data indicating this measured weight is being transmitted to the indicator 400 so that the indicator 400 can use the data to determine the weight of the grain cart 10 and the crop material which can then be used to determine the weight of just the crop material in the storage hopper 60. As the crop material continues to be unloaded from the storage hopper 60, the weight measured by the load cell 48 will continually be decreasing because more and more crop material is discharging from the storage hopper 60.

When the indicator 400 determines that the desired weight of crop material has been unloaded (or will soon be loaded), the indicator 400 can transmit an electrical signal along the output connection 370. This electrical signal can be passed to the automatic unload harness 350 where it will be passed to the close gate conductor wire 358A. The relay 360 can be used to boost the electrical signal from the indicator 400 to a voltage sufficient (such as 12 volts) to trigger the gate solenoid valve 460 controlling the gate actuator 470. With the electrical voltage on the close gate conductor wire 358A of the automatic unload wiring harness 350 and the close gate conductor wire 348A of the hydraulic wiring harness 340, the gate solenoid valve 460 would receive the same voltage that it would expect to see from the gate close switch 450, even though the operator is not pushing the control interface 300 forward to engage the gate close switch 450. Once the gate solenoid valve 460 receives this voltage, it would alter the flow of hydraulic fluid to the gate actuator 470 to close the gates 72 and thereby cover the openings 74 in the center portion 66 of the storage hopper 60 stopping any more crop material from exiting from the storage hopper 60.

In this manner, the operator in the cab of the tow vehicle does not have to pay attention to the decreasing weight of the storage hopper 60 as provided on the display 402 of the indicator 400 and instead when the desired predetermined weight is reached, the indicator 400 can send a signal to the automatic unload wiring harness 350 that provides the same voltage the gate solenoid valve 460 would expect to see if the gate close switch 450 was engaged and as a result the gate solenoid valve 460 can route hydraulic fluid to the gate actuator 470 to close the gates 72 in the center portion 66 of the storage hopper 60 to be closed.

Because the transport assembly 70 and the auger assembly 80 each have a substantial length, a relatively substantial amount of crop material can still be present in the transport assembly 70 and the auger assembly 80 after the gates 72 are closed. As a result, crop material will not stop discharging out of the discharge assembly 140 of the auger assembly 80 as soon as the gates 72 are closed, but instead, crop material will continue being discharged out of the discharge assembly 140 of the auger assembly 80 until all of the crop material has been moved out of the transport assembly 70 and the auger assembly 80. This causes a delay between when the gates 72 are closed and when crop material stops being discharged out of the auger assembly 80. In one aspect, an operator can enter a pre-set threshold value indicating that the gates 72 should be closed before the predetermined weight of crop material is measured by the load cells 48. For example, the operator might set this threshold value as 99% or 98% of the desired weight of crop material. This threshold value can then be used to modify the desired weight of crop material entered by the operator in the indicator 400 into the predetermined weight of crop material the indicator 400 is monitoring for and when this predetermined weight of crop material is measured by the load cells 48, the indicator 400 can generate an electrical signal along the output connection 370. For example, if the threshold value is 99% or 98%, the predetermined weight of crop material the indicator 400 is monitoring for will be 99% or 98% of the desired weight of crop material entered by the operator into the indicator 400. In this manner, the gates 72 will be closed before the desired weight of crop material input by the operator is measured by the load cells 48, when the predetermined weight of crop material is reached, and the gates 72 will be closed and then the crop material remaining in the transport assembly 70 and auger assembly 80 will continue to discharge out of the grain cart 10 until it is also discharged.

With this system, if at any time during the unloading of the crop material and before the desired predetermined weight of crop material has been unloaded, the operator can engage the gate close switch 450 by pushing the control interface 300 forward. This would still send the proper voltage through the control interface wiring harness 330, the automatic unload wiring harness 350 and the hydraulic wiring harness 340 to the gate solenoid valve 460 which will alter the flow of hydraulic fluid to the gate actuator 470 causing the hydraulic actuator 470 to close the gates 72. In this manner, the operator will still have manual control over closing the gates 72 and stopping the flow of crop material through them before the desired predetermined weight of crop material is reached. This can allow the operator to stop it early if he or she changes his mind, there is a problem, etc. This also can improve the safety of the system because the operator can manually override the operation of the grain cart 10 and manually control the closing of the gates 72.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A grain cart comprising:
   a frame;
   at least two ground wheels attached to the frame;
   a hitch assembly attached to a front end of the frame;
   a storage hopper provided on the frame, the storage hopper having a center portion in a bottom of the storage hopper;
   an auger assembly operatively connected to the storage hopper to discharge particulate material from the storage hopper out of the grain cart;
   a transport assembly provided beneath the center portion of the storage hopper to direct crop material into the auger assembly;
   at least one opening in the center portion of the storage hopper leading into the transport assembly;
   at least one selectively openable gate associated with each of the at least one opening and operable to cover and uncover the opening;
   a gate actuator operably connected to each gate and operable to open and close each gate;
   at least one load cell positioned on the grain cart to measure a weight of crop material in the grain cart;
   a gate close switch;
   an indicator operably connected to the at least one load cell, the indicator operative to receive signals from the at least one load cell indicating the weight measured by the at least one load cell and to automatically send an electrical signal on an output connection in response to receiving a signal from the load cell indicating a predetermined weight of crop material has been removed from the grain cart; and
   at least one close gate conductor wire operatively connected between the gate close switch and the gate actuator such that a voltage applied to the at least one close gate conductor wire will cause the gate actuator to close each gate, the output connection of the indictor electrically connected to the at least one close gate conductor wire,
   wherein when the indicator sends the electrical signal on the output connection, the electrical signal passes to the at least one close gate conductor wire and the gate actuator closes each gate.

2. The grain cart of claim 1 further comprising a relay provided between the output connection of the indicator and the at least one close gate conductor wire to supply a voltage greater than the electrical signal to the at least one close gate conductor wire.

3. The grain cart of claim 1 further comprising a gate open switch and at least one open gate conductor wire operatively connected between the gate open switch and the gate actuator such that a voltage applied to the at least one open gate conductor wire will cause the gate actuator to open each gate.

4. The grain cart of claim 1 wherein the gate actuator is a double acting hydraulic cylinder.

5. The grain cart of claim 4 further comprising a gate solenoid valve operative to control the gate actuator.

6. The grain cart of claim 5 the gate solenoid valve having a first input electrically connected to the at least one gate close gate conductor wire wherein an electrical voltage supplied to the first input of the gate solenoid valve causes the gate actuator to close each gate and a second input electrically connected to at least one gate open gate conductor wire wherein an electrical voltage supplied to the second input of the gate solenoid valve causes the gate actuator to open each gate.

7. The grain cart of claim 6 wherein the gate close switch and a gate open switch are provided in a control interface.

8. The grain cart of claim 1 wherein an operator enters a desired weight of crop material to be unloaded and a threshold value and the threshold value is used to determine the predetermined weight of crop material.

9. The grain cart of claim 8 wherein the predetermined weight of crop material is less than the desired weight of crop material to be unloaded.

10. The grain cart of claim 1 further comprising a power take off assembly connectable to a power take off on a tow vehicle to drive the auger assembly, wherein the indicator starts storing weight measurements from the at least one load cell when a proximity sensor senses motion of the power take off assembly and stops storing weight measurements from the at least one load cell when the proximity sensor senses the motion of the power take off assembly has stopped.

11. The grain cart of claim 1 wherein the at least one load cell measures a weight of the grain cart.

12. An automatic unload wiring harness for modifying a grain cart to automatically unload an amount of crop material, the automatic unload harness comprising:
    a first connector connectable to a control interface wiring harness connector;
    a second connector connectable to a hydraulic wiring harness connector;
    an indicator connector connectable to an output connection of an indicator;
    a plurality of automatic unload conductor wires connected between the first connector and the second connector;
    wherein a third gate close conductor wire is one of the plurality of automatic unload conductor wires, the third gate close conductor electrically connecting a first gate close conductor wire and a third gate close conductor wire when the first connector of the automatic unload wiring harness is connected to the control interface wiring harness connector and the second connector of the automatic unload wiring harness is connected to the hydraulic wiring harness connector, and wherein the indicator connector is electrically connected to the third gate close conductor,
    and wherein the first gate close conductor wire is electrically connected to a close gate switch,
    and wherein the second gate close conductor wire is electrically connected to a gate solenoid valve connected to a gate actuator, the gate solenoid valve operative to cause the gate actuator to close a gate stopping crop material from discharging from a storage hopper of the grain cart in response to a voltage being supplied on the second gate close conductor to the gate solenoid valve.

13. The automatic unload wiring harness of claim 12 further comprising a relay provided between the indicator connector and the third gate conductor wire to supply a voltage greater than the electrical signal to the third gate conductor wire.

14. A method of modifying a grain cart to automatically unload a predetermined weight of crop material, the method comprising:
    providing a grain cart having:
        a storage hopper for storing crop material;
        at least one load cell positioned on the grain cart to measure a weight of crop material in the grain cart; and
        at least one close gate conductor wire operatively connected between a gate close switch and a gate actuator such that a voltage applied to the at least one close gate conductor wire causes the gate actuator to close a gate in the storage hopper stopping crop material from discharging out of the storage hopper;
    providing an indicator operably connected to the at least one load cell, the indicator operative to receive signals from the at least one load cell indicating the weight measured by the at least one load cell and operative to send an electrical signal on an output connection in response to receiving a signal from the load cell indicating a predetermined weight of crop material has been removed from the grain cart; and
    electrically connecting the output connection of the indicator to the at least one close gate conductor wire.

15. The method of claim 14 further comprising providing a relay between the output connection and the at least one close gate conductor wire to supply a voltage greater than the electrical signal from the output connection of the indicator to the at least one close gate conductor wire.

16. The method of claim 15 wherein the output connection of the indicator is electrically connected to the at least one conductor wire using an automatic unload wiring harness.

17. The method of claim 16 wherein the automatic unload harness comprises:
    a first connector connectable to a control interface wiring harness connector,
    a second connector connectable to a hydraulic wiring harness connector;
    an indicator connector connectable to the output connection of the indicator;
    a plurality of automatic unload conductor wires connected between the first connector and the second connector; and
    wherein a third gate close conductor wire is one of the plurality of automatic unload conductor wires, the third gate close conductor electrically connecting a first gate close conductor wire and a third gate close conductor wire when the first connector of the automatic unload wiring harness is connected to the control interface wiring harness connector and the second connector of the automatic unload wiring harness is connected to the hydraulic wiring harness connector,
    and wherein the indicator connector is electrically connected to the third gate close conductor.

* * * * *